United States Patent
Ulichney

(10) Patent No.: US 6,690,389 B2
(45) Date of Patent: Feb. 10, 2004

(54) TONE MODIFYING DITHERING SYSTEM

(75) Inventor: Robert A. Ulichney, Stow, MA (US)

(73) Assignee: Compaq Computer Corporation, Houston, TX (US)

(*) Notice: Subject to any disclaimer, the term of this patent is extended or adjusted under 35 U.S.C. 154(b) by 530 days.

(21) Appl. No.: 09/728,709

(22) Filed: Dec. 5, 2000

(65) Prior Publication Data

US 2001/0045957 A1 Nov. 29, 2001

Related U.S. Application Data

(63) Continuation of application No. 08/428,754, filed on Apr. 25, 1995, now abandoned.

(51) Int. Cl.$^7$ .............................. G09G 5/00; H04N 1/40
(52) U.S. Cl. ...................... 345/691; 358/3.13; 382/169; 345/596
(58) Field of Search .................................. 345/691, 692, 345/693, 89, 596–599; 348/671, 672, 674, 676; 358/518, 519, 534, 535, 536, 3.13–3.19; 382/168, 169, 237

(56) References Cited

U.S. PATENT DOCUMENTS

| | | | |
|---|---|---|---|
| 5,081,528 A | | 1/1992 | Hayashi et al. ............... 358/75 |
| 5,111,310 A | | 5/1992 | Parker et al. ................. 358/456 |
| 5,196,924 A | * | 3/1993 | Lumelsky et al. ............. 358/32 |
| 5,268,774 A | * | 12/1993 | Eschbach ..................... 358/466 |
| 5,473,439 A | | 12/1995 | Pappas ........................ 358/298 |
| 5,495,345 A | * | 2/1996 | Ulichney ..................... 358/457 |
| 5,495,346 A | | 2/1996 | Choi et al. ................... 358/457 |
| 5,497,180 A | | 3/1996 | Kawakami et al. ........... 347/131 |
| 5,535,020 A | | 7/1996 | Ulichney ..................... 358/457 |
| 5,553,200 A | * | 9/1996 | Accad ......................... 358/457 |
| 5,760,920 A | * | 6/1998 | Lin et al. ..................... 358/457 |

OTHER PUBLICATIONS

Rosenberg, Charles J. "Measurement–based Evaluation of a Printer Dot Model for Halftone Algorithm Tone Correction", Hewlett–Packard Laboratories, pp. 205–212, Jul. 1993.

Allebach, J.P. "Binary Display of Images When Spot Size Exceeds Step Size", pp. 2513–2519, Aug. 1980.

Stucki, P. "MECCA–A Multiple–Error Correction Computation Algorithm for Bi–Level Image Hardcopy Reproduction", IBM Zurich Research Laboratory, Feb. 1981.

Pappas, Thrasyvoulos N. et al. "Measurement of Printer Parameters for Model–Based Halftoning", AT&T Bell Laboratories, pp. 193–204, Jul. 1993.

Mitsa Theophano et al. "Wavelets as a Tool for the Construciton of a Halftone Screen", University of Iowa, (date unknown).

* cited by examiner

Primary Examiner—Lun-Yi Lao
(74) Attorney, Agent, or Firm—Cesari and McKenna, LLP

(57) ABSTRACT

A method for correcting the tone of an input image for display on a given output device includes the steps of generating a dither template having advantageously more threshold levels than color levels of the input image. A tone characteristic for the output device is determined by comparing actual output pixel values against expected image pixel values. The tone characteristic curve is scaled to correspond with the number of threshold values in the dither template, and is stored in a look-up table having a number of entries corresponding to the number of threshold values in the dither template. The dither template values are fed to the look-up table, which provides an adjusted dither template which reflects the tone correction required to provide an output image free of tone distortion. The adjusted dither template is then normalized in accordance with characteristics of the input and output display devices. Elements of the normalized dither template are compared against incoming image pixels to determine which input image pixels are to be displayed on the output device.

20 Claims, 8 Drawing Sheets

| 7 | 2 | 15 | 9 |
|---|---|---|---|
| 0 | 5 | 13 | 11 |
| 12 | 10 | 1 | 4 |
| 3 | 19 | 8 | 6 |

Fig. 3A

| 1 | 0 | 15 | 2 |
|---|---|---|---|
| 0 | 1 | 8 | 4 |
| 6 | 3 | 0 | 0 |
| 0 | 11 | 2 | 1 |

Fig. 3B

| 1 | 0 | 14 | 2 |
|---|---|---|---|
| 0 | 0 | 8 | 4 |
| 5 | 3 | 0 | 0 |
| 0 | 10 | 1 | 1 |

Fig. 3C

TONE MODIFYING DITHERING SYSTEM

This is a continuation of application Ser. No. 08/428,754 filed on Apr. 25, 1995, now abandoned.

FIELD OF THE INVENTION

This invention relates generally to computer graphics and more particularly to the representation of an input image by an output device.

BACKGROUND OF THE INVENTION

As it is known in the art, digital halftoning is a process of generating a pattern of binary pixels that is representative of a given input image. Much effort has been made in the field of halftoning to ensure that the output image is a pleasing representative of the input image and possesses minimal visual side-effects, such as repeating structures, which impart an unnatural appearance to the resulting output image.

Digital halftoning is used to represent an input image comprising a number of picture elements (referred to in the art as 'pixels') on an output device. Typically digital halftoning is used when the output device is not capable of representing each of the color values of the input image, where here color refers to either the chrominance or luminance value of the input image. For example, in the case of printing monochrome images, the number of input levels is 256 and the number of output levels is 2. By varying the ratio of black pixels to white pixels throughout the output image, the effect of 256 color levels is achieved.

One technique for providing a halftoned image is through ordered dithering. Ordered dithering uses a dither matrix, which is an array of integer threshold values, to produce the shaded output image. The dither matrix is commonly smaller than the input image, and is repeatedly tiled over the input image. Each color value of the input image is compared against a dither matrix threshold value. When the input value is greater than the threshold value, the output pixel is turned "on", if the input value of the pixel is less than or equal to the threshold value, the output pixel is turned "off". Because the dither matrix thresholds essentially determine which pixels of the input image are displayed on the output device, the ordering of the threshold values in the dither matrix is important to the quality of the output image.

Various processes for arranging threshold values within a dither matrix have been developed. One method for assigning dither matrix threshold values is described in U.S. patent application Ser. No. 07/961,244 U.S. Pat. No. 5,538,020, entitled "Void and Cluster Apparatus and Method for Generating Dither Templates", filed Oct. 15, 1992 by Robert A. Ulichney (hereinafter referred to as the void and cluster patent). According to the process disclosed in the void and cluster patent, threshold values are assigned according to a characteristic of a pixel stored in a corresponding location of a homogeneously distributed pattern of binary elements. Accordingly, because threshold values are assigned through the use of a homogeneously distributed pattern of binary elements, an output image provided using the void and cluster dither matrix possesses few low frequency spatial characteristics, and is therefore visually pleasing.

The void and cluster method of providing dither matrix threshold values is a significant advancement over the compute intensive methods of the prior art which required numerous iterations and neighborhood calculations to achieve a less visually pleasing result.

While all dithering processes aim to provide a visually pleasing image, the result is not always achieved. A performance loss arises because virtually all halftoning methods assume a perfect square printer dot as the output dot. However, the printer dots produced by a printer vary in size depending upon the individual characteristics of the printer. As a result, printed images halftoned with the above described processes may be distorted versions of the original image. Traditionally, an attempt is made to remove printer-based distortions via measurement-based techniques known as tone correction which calibrate a halftoning method for a each specific printer.

Referring now to FIG. 1A, a graph plotting the measured output values provided by a typical halftoned system versus the desired output values illustrates the need for tone correction of the output image. The amount by which the output pixel value differs from the desired value is the tone error of the output image. In the case of hardcopy, the tone error may be determined by measuring an output image with a device referred to as a reflection densitometer. A tone characteristic curve, $y=f(x)$, such as that shown in FIG. 1A, is derived by plotting the measured value against the desired value and normalizing the ranges to be between 0 and 1.

Once the tone error of the output image is determined, a prior art method of correcting the output image included deriving the inverse function, $y=f^{-1}(x)$ of the tone characteristic curve, as shown in FIG. 1B. The inverse characteristic curve is used to map input pixel levels to adjusted pixel levels. Accordingly, the input level is compensated for the tone error of the output device prior to the dithering of the input image.

One drawback of the above described tone correction method is that it reduces performance of the graphics system because it requires an additional mapping operation to be performed on every input pixel. Another drawback of the above described method is the loss of fidelity of the output image. The loss of fidelity arises, as shown in FIG. 1B, because in some portions of the curve the slope is less than one. When the slope is less than one, more than one input pixel level maps to the same adjusted pixel level. The result is a loss of input representation levels of the input image and accordingly a loss of fidelity of the image.

SUMMARY OF THE INVENTION

According to one aspect of the invention, a method of providing an output image for display on an output device representative of an input image, includes the steps of generating a dither array comprising a plurality of threshold values, adjusting the threshold values of the dither array in accordance with a tone characteristic of the output device, and comparing the adjusted dither template values against the input image pixels to determine which input image pixels are to be displayed on the output device. With such an arrangement, the overall performance of the graphics system is increased because the tone correction of an input image may be compensated for in the dither template, and a separate operation need not be performed on each input image pixel by the graphics system.

According to a further aspect of the invention, the plurality of threshold values of the dither template exceeds said representation levels of said input device, and the step of providing an output image further includes the step of normalizing the adjusted threshold values of said dither template prior to comparing the adjusted dither template values to the input image pixels. With such an arrangement, the fidelity of the output system is increased because providing a large number of threshold values in the dither template allows for a one to one mapping of tone adjusted pixels to expected pixels of the input device.

BRIEF DESCRIPTION OF THE DRAWINGS

The above-mentioned and other features of the invention will now become more apparent by reference to the following description taken in connection with the accompanying drawings in which:

FIG. 3A is an example dither template produced by a dither template generator of the graphics system of FIG. 2;

FIG. 3B is an example dither template produced by correcting the dither template of FIG. 3A using a tone correction look-up table such as that used in FIG. 2;

FIG. 3C is an example dither template produced by normalizing the dither template of FIG. 3B using a normalization system such as that described in FIG. 2;

DESCRIPTION OF THE PREFERRED EMBODIMENT

Figure 2:
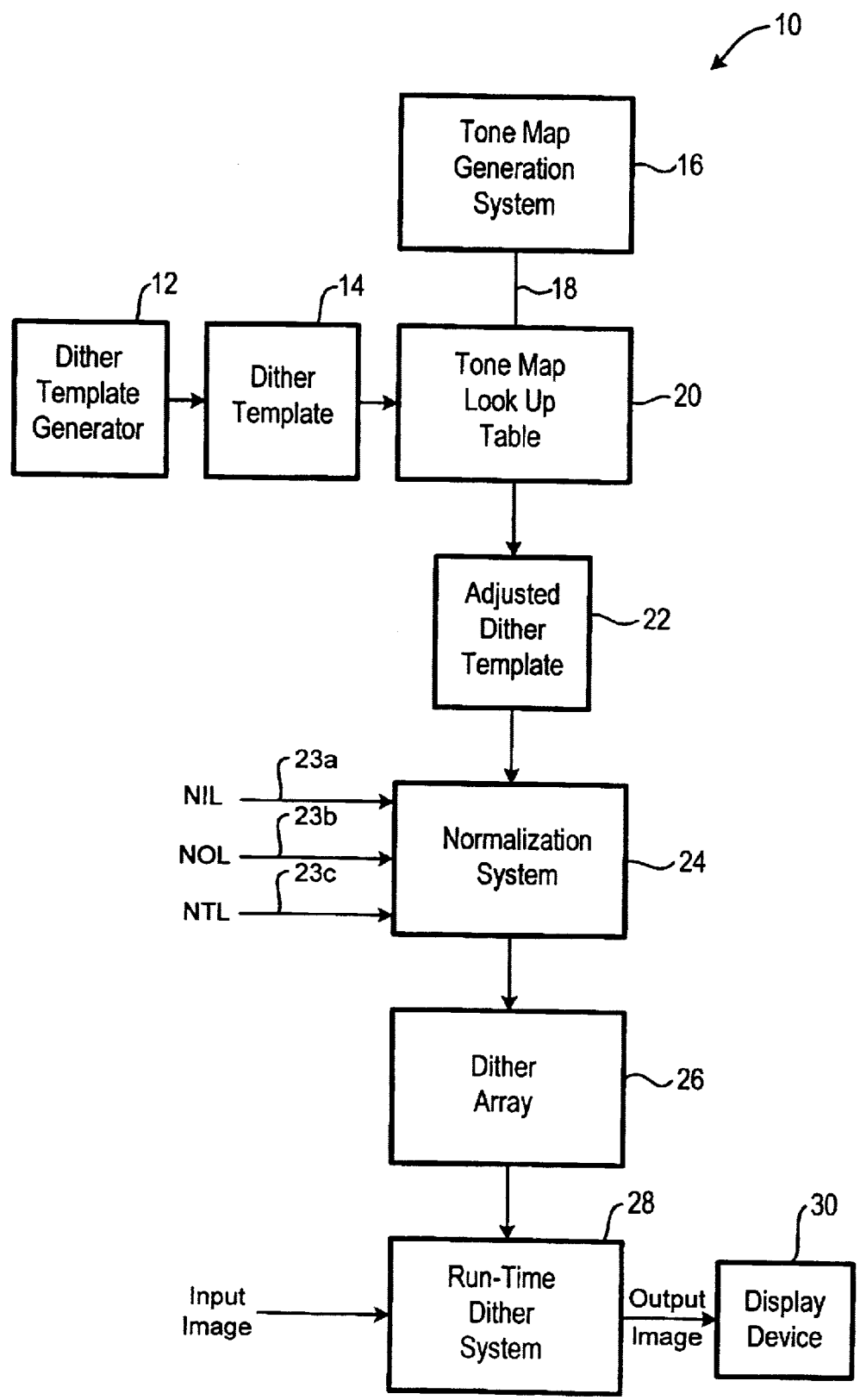
FIG. 2 illustrates a block diagram of the graphics system incorporating the present invention.

Referring now to FIG. 2, a graphics subsystem 10 is shown to receive an input image from a computer system, video system or a similar type device (not shown), and to provide an output image to a display device 30. The display device may, for example, be a printer or some similar type device. The graphics subsystem 10 resides in the portion of the computer system which interfaces the central processing unit to the external display device.

For purposes of simplicity, the possible chrominance and luminance values of the input and output pixels will be hereinafter referred to in the specification as 'levels' because it is believed that such nomenclature adequately embodies both color and gray scale representation.

The graphics subsystem 10 includes a dither template generator 12 and a tone map generator 16. The dither template generator 12 provides a dither template 14 to a tone map Look Up Table (LUT) 20. The dither template 14 comprises an M×N template of threshold values. The tone map generator 16 provides tone correction data via line 18 to tone map LUT 20. The tone map generator 16 thus includes information about the characteristics of the display device 30.

Tone map LUT 20 provides an adjusted dither template 22 to a normalization system 24. The normalization system receives 3 items of data from a coupled processor system (not shown). The 3 items of data include the Number of Input Levels (NIL) on line 23a, the Number of Output Levels (NOL) on line 23b, and the Number of Template Levels (NTL) on line 23c. Accordingly, the normalization system serves to 'normalize' the threshold values of the adjusted dither template to be specific to the image currently being provided to the display device 30, as will be described in more detail later herein.

The normalization system provides a normalized dither array 26 to a run-time dither system 28. The run-time dither system 28, inter alia, evaluates integer threshold values of the normalized dither matrix against the pixel levels of the input image to provide an output image to the display device 30.

The tone map generator 16, the dither template generator 12, and normalization system 24 each operate at the startup of the computer graphics system 10, or when a new output device is coupled to the computer graphics system, to provide the dither template 14, tone map lookup table 20, and thus the normalized dither array 26. The tone map generator 16 pre-adjusts the threshold values of dither template 14 prior to normalization to accommodate the tone-error of the given output device. Accordingly, the complexity of the run-time system is reduced because each incoming pixel of the input image does not require mapping prior to evaluation using the normalized dither template 26. As a result, the overall performance of the run-time system is increased.

The production of the normalized dither template is described in detail below.

Dither Template Generator

As mentioned previously, the assignment of the thresholds within a dither template is an important step toward providing a dithered output image with minimal visual side effects. Various attempts have been made at arranging the threshold values in the dither template. One problem encountered by prior art ordered dithering techniques arises because the dither template is commonly smaller than the input image, and thus is repeatedly tiled over the input image for purposes of comparing the threshold values of the template against the incoming image pixels levels. Because of the templates are tiled over the image, regular patterns appear in the output images, typically on the boundary edges of the tiled templates.

A second known problem with ordered dither templates is that they may tend to produce an output image with increased low frequency spatial characteristics. Low frequency spatial characteristics in an output image introduce residual visual artifacts which diminish the quality of the output image. Additional problems with ordered dithering methods arose because the complexity of the calculations required to derive the template limited the allowable number of threshold values that could be stored in the dither template. When the number of potential thresholds stored in the dither template was equal to the number of input pixel levels, fidelity problems were commonly encountered.

One ordered dithering method which provides a dither template with homogeneous attributes is described in U.S. patent Ser. No. 07/961,244, U.S. Pat. No. 5,535,020 entitled "Void and Cluster Apparatus and Method for Generating Dither Templates", by Robert A. Ulichney, hereinafter referred to as the void and cluster patent, and incorporated by reference.

Until the introduction of the Void-and-Cluster dither templates, the maximum number of threshold levels in the prior art was 256, regardless of the size of the dither template. Through use of the void-and-cluster method, dither templates having threshold levels exceeding the number of input levels are easily provided. For example, given a dither template of 256×256 pixels, the void-and-cluster method is capable of providing a dither template having 64K unique threshold levels. By providing a higher number of threshold levels than the number of input pixel levels, the fidelity of the output image is increased for reasons that will be described later herein.

It should be noted that, although the void and cluster dither templates are the preferred template of choice due to their ability to provide a unique value for each template element, this invention should not be limited to solely those embodiments incorporating void and cluster dither templates. Rather, any dither template may be used, with the understanding that the fidelity of output images will be reduced for those templates having a number of threshold levels less than or equal to the number of levels of the input image.

Referring now to FIG. 3A, for purposes of example, a sample dither template 50 having 16 threshold values ranging from 0 to 15 is shown. Each threshold element of the dither template 50 is hereinafter referred to as a RANK. In this example, an input image having 16 input pixel levels will be dithered using the template 50. As the discussion of the tone correction system according to the invention continues, the dither template 50 will aid to illustrate the fidelity problems that can be encountered when the number of threshold values is equal to the number of input levels of an image.

The Tone Map Generation System

As discussed previously, ordered dithering provides a method for shading output images to make it appear as though more levels are being displayed than are actually capable of being rendered by the output device. One drawback of the dithering systems are that they are designed under the assumption that black output pixels are the same physical size as white output pixels. Often, however, the physical characteristics of the printer device are such that the black output pixels forms a much larger dot than its white counterpart, or visa versa. As a result, even images that have had their intermediate values rendered using dithering may require tone correction to preserve the intended tone value in the output image.

In order to determine exactly what type of compensation is required to obtain a desired output image, the characteristics of the output image may be measured using input data and the resultant output data. For a given output device, such as a printer or a CRT, a characteristic function y=f(x) of the output device 30 may be generated to describe the desired output image value, x, against the generated output image value, y, for all values of x. The characteristic function may be empirically determined by direct measurement of several constant patches of incrementally increasing value from 0 ("black", or the case of all pixels in the dither period being off) to 1 ("white" or the case of all pixels in the dither period being on). In addition, several other methods used to generate the y=f(x) curve are well known to one of skill in the art. For example, in the case of hardcopy, a reflection densitometer can be used for such purpose.

Figure 1A:
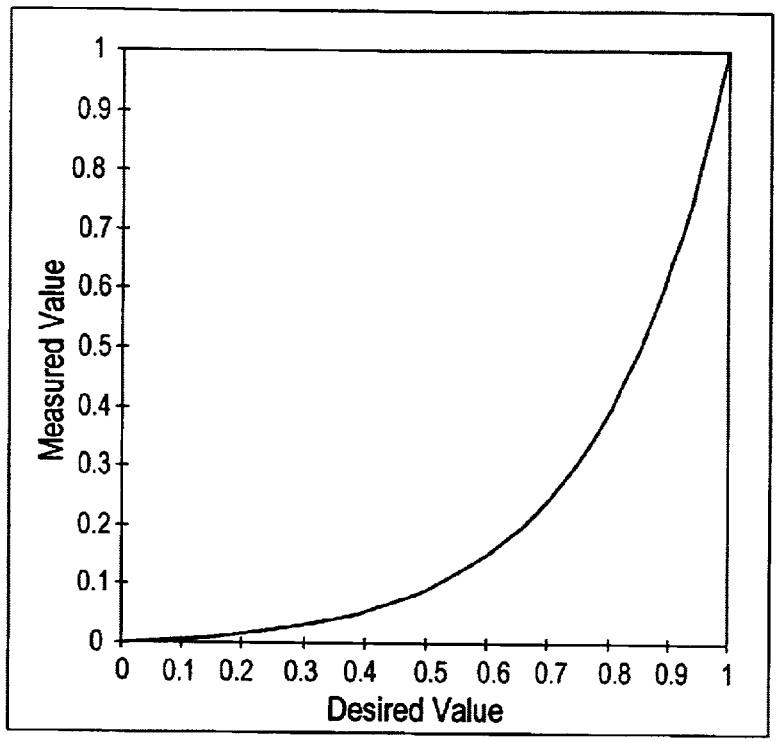
FIG. 1A illustrates a tone error characteristic for an example printer device.
Figure 1B:
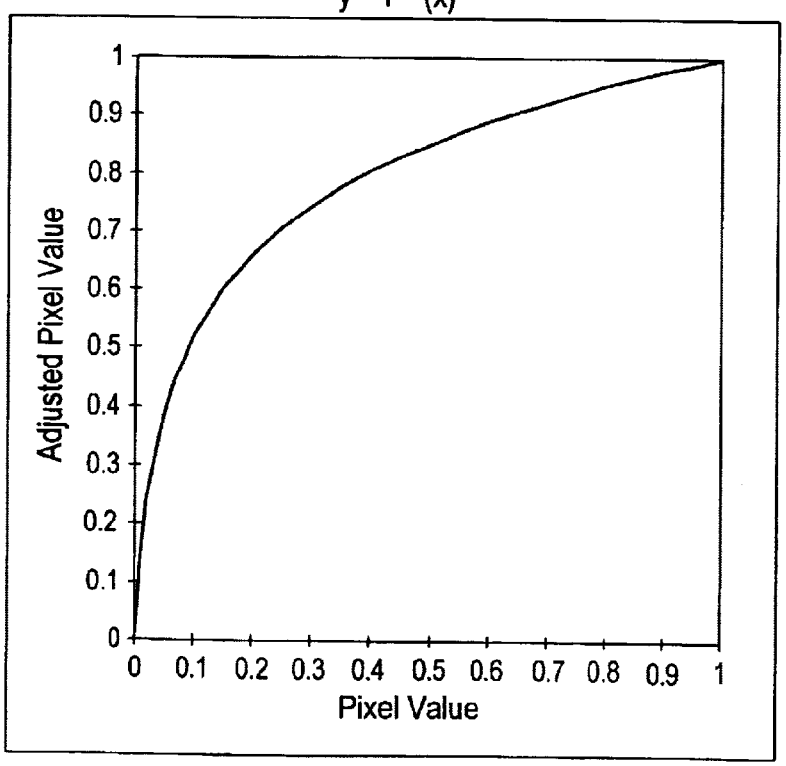
FIG. 1B illustrates the inverse function of the characteristic of the printer device shown in FIG. 1A.

Referring again briefly to FIG. 1, an example of a characteristic function y=f(x) is shown normalized to range from 0 to 1. The measured output value can be some absolute metric, such as reflectance, or a relative one in terms of the output of another dithering method. Suffice it to say that the characteristic function describes a relationship between a determined desired output and an actual output. The desired output is the selection of the designer, and is go not here meant to indicate an ideal output.

Once the characteristic function y=f(x) has been determined for a given output device, the normalized values of the curve are scaled in range to equal the number of threshold levels in the dither template 14. The scaled threshold values of the characteristic function y=f(x) are loaded into the tone map look-up table (LUT) 20 (FIG. 2).

The Tone Map LUT is a storage device, such as a Random Access Memory (RAM), with a number of entries equal to the number of threshold values in the dither template 14 provided from the dither template generator 12. Each threshold value is hereinafter referred to as a RANK. As a threshold RANK is input as an index to the tone map LUT 20, an adjusted threshold value, hereinafter referred to as $RANK_A$ is provided as output. Thus, by applying each of the RANK values of the dither template 14 to the tone map LUT 20, an adjusted dither template 22 is provided.

Figure 4:
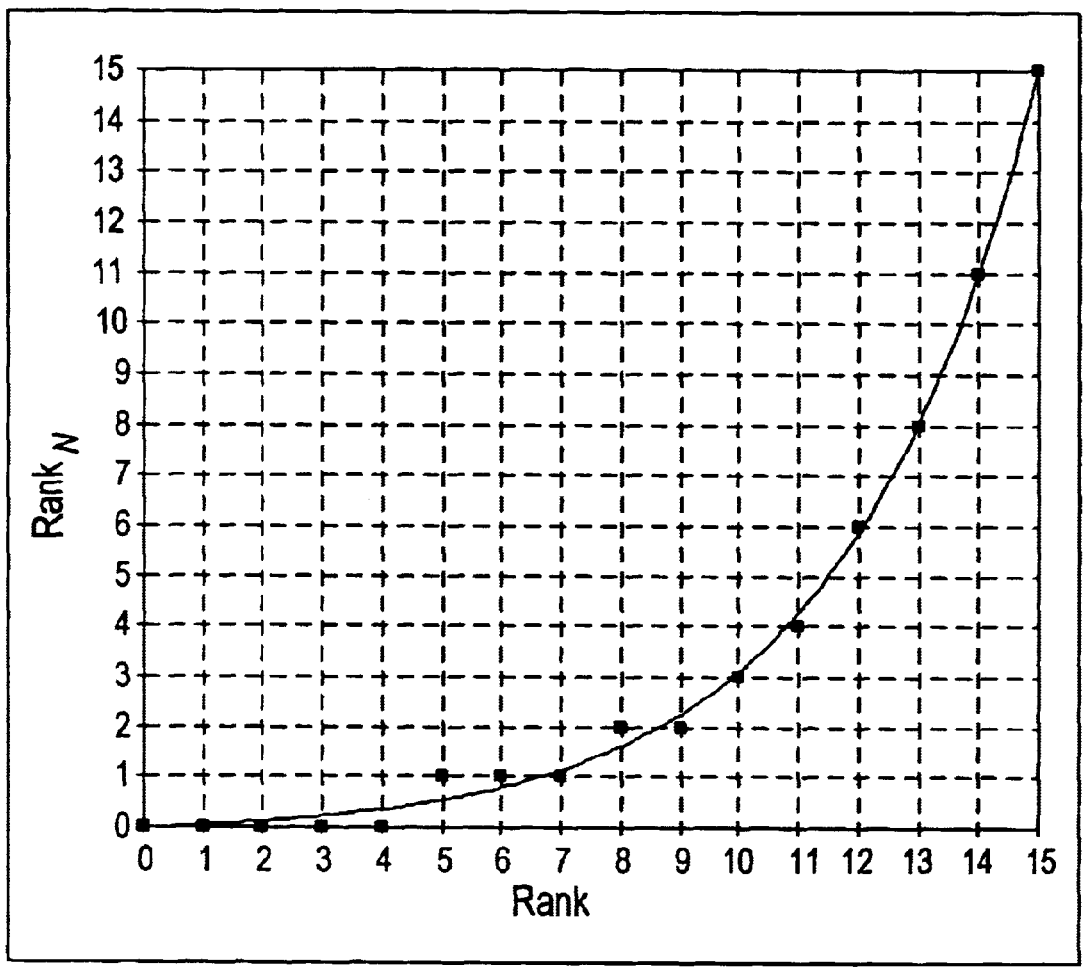
FIG. 4 is a graph illustrating the adjusted value of the dither template of FIG. 3A after mapping using tone correction data.

Referring now to FIG. 4, a graph illustrating the relationship between the RANK values stored in the dither template and the $RANK_A$ values stored in the adjusted dither template is shown. Note that the curve of FIG. 4 aligns with the tone error curve of FIG. 1, where each boxed black dot on the curve of FIG. 4 indicates a $RANK_A$ output for the given RANK input.

The adjusted dither template value, $RANK_A$, provided from the Tone Map LUT 22, as shown in FIG. 4, may be derived according to Equation I.

$$RANK_A=(NTL-1)\times f(RANK/(NTL-1)) \qquad \text{EQUATION I}$$

Where NTL=number of template levels, f(x) is the characteristic function of the output device, and RANK is the original threshold value stored in the dither template 14 by dither template generator 12.

As mentioned previously, the number of threshold values in the dither template advantageously exceeds the number of input representation levels. However, referring again to our example of having 16 input levels and 16 threshold values, as shown in FIG. 4, there is a many-to-one mapping of RANK values to the $RANK_A$ values. Accordingly, although the input RANK values range from 0 to 15, and provide 16 unique threshold values, the resultant output from the tone map LUT 20 provides only 9 unique output $RANK_A$ threshold values.

The effect that such a deviation will have on the output image can be shown through a discussion of the operation of the normalization system and the run-time system. However, referring briefly to FIG. 3B, the preliminary effects that the many-to-one mapping has on the adjusted dither template 52 can be seen. Note that only dither threshold values 0, 1, 2, 3, 4, 6, 8, 11 and 15 are represented in the resulting adjusted dither template 52.

This adjusted dither template 52 is then passed onto the normalization system 24.

Normalization of the Dither Template

As discussed previously, the adjusted dither template advantageously may comprise more threshold levels than input levels of the input device. Accordingly, the adjusted dither template 22 (FIG. 2) is normalized in accordance with the parameters (Number of Input Levels [NIL] and Number of Output Levels [NOL]) of the attached input and output devices, and in accordance with the number of threshold levels (NTL). The above listed parameters, NOL, NIL and NTL may be provided from a central processor unit (not shown) attached to the graphics subsystem, or may be stored in special purpose registers inside of the graphics system, to be written through software executing on the attached central processor unit.

To perform normalization of the adjusted dither template, input color levels are 'quantized'; that is, the available input levels are apportioned into the appropriate output levels. Preferably the quantizer function used above performs a mean-preserving quantization such as that described in pending U.S. patent application, Ser. No. 07/961,573 U.S. Pat. No. 5,495,345 entitled "Imaging System with two Level Dithering Using a Comparator", filed Oct. 15, 1992 by Ulichney et al. The Ulichney patent describes a quantization approach wherein the input pixel values are evenly distributed between the output pixel values such that a mean distribution is maintained.

Although the quality of the output image is improved through the use of the quantization method described in the Ulichney patent, it should be understood that the present invention is not limited to such a method of quantization. Rather, any method known by those of skill in the art to allocate input image levels to output image levels, that provides visually pleasing results, may be used.

In the present embodiment, the Quantization step size is defined by below equation II.

$$\Delta Q = (NIL-1)/(NOL-1) \qquad \text{EQUATION II}$$

Where NIL is the number of input color levels of the input image, NOL is the number of output levels capable of being displayed on the output device, and $\Delta Q$ represents the quantizer step size.

Once the quantizer step size is determined, the adjusted dither template threshold values may be normalized to conform with the appropriate input and output levels. The number of dither template threshold values is advantageously greater than the number of levels of the input image. The normalizer remedies these problems by scaling the threshold values in accordance with the number of input levels.

Normalization is achieved via equation III shown below, where $RANK_N$ indicates the normalized threshold value stored in the normalized dither array 26 (FIG. 2).

$$RANK_N = int\{\Delta Q/NTL \times (RANK_A + \tfrac{1}{2})\} \qquad \text{EQUATION III}$$

Where "int{ }" represent integer truncation, or the rounding-down operation and NTL is the number of template levels of the original dither template 14.

Figure 5:
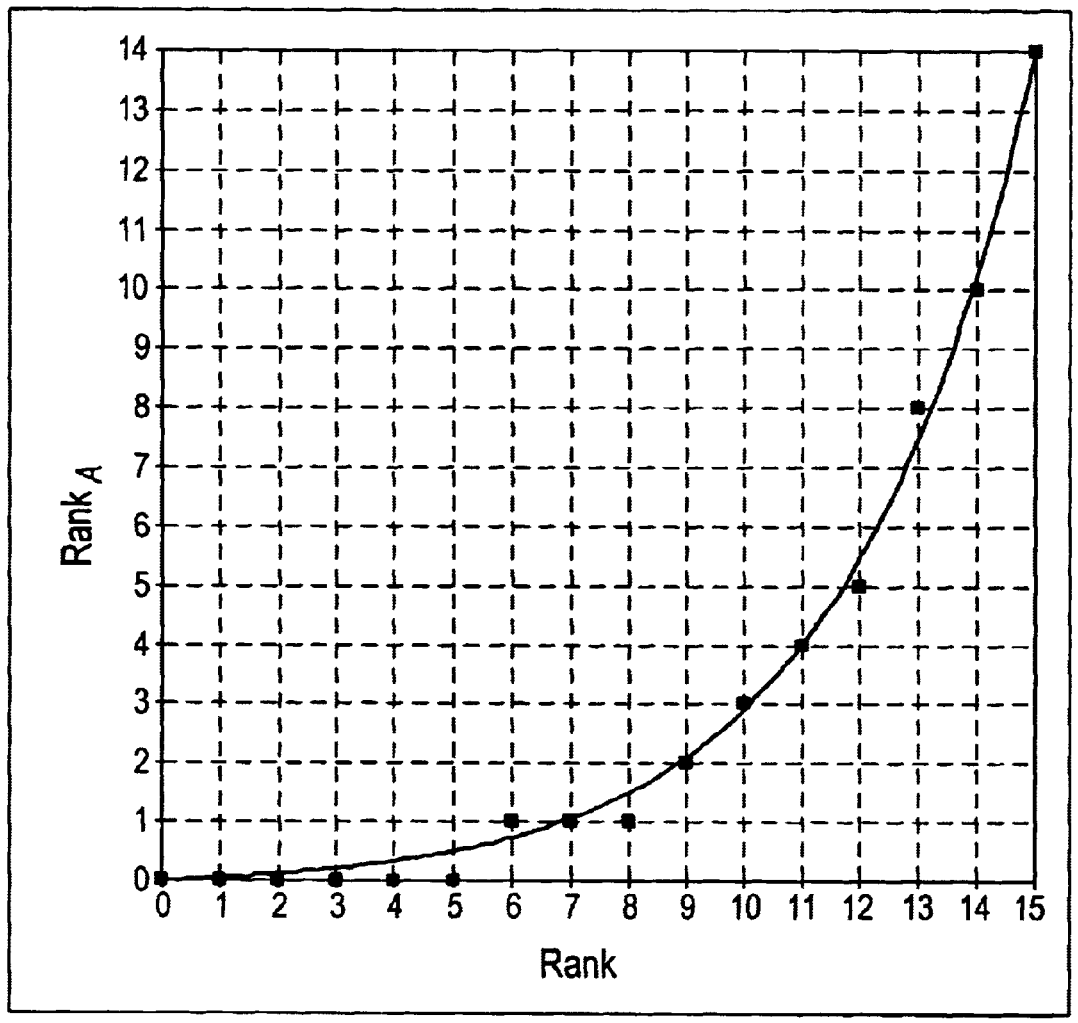
FIG. 5 is a graph illustrating the effects of normalizing the adjusted dither template values of FIG. 4.

Referring now to FIG. 5, a graph illustrating the effects of normalizing the dither template of our example (dither template 52 in FIG. 3B) using the above normalization equation is shown. In FIG. 5, the original RANK values, (from dither template 50 in FIG. 3A) are plotted against the resulting normalized threshold values, hereinafter referred to as $RANK_N$.

Note that after normalizing the dither template having the same number of threshold values and input levels, only nine unique levels remain. Referring briefly to FIG. 3C, a representation of the resulting normalized dither template is shown to have $RANK_N$ values of 0, 1, 2, 3, 4, 5, 8, 10, 14. This normalized dither template is what is used during operation by the run-time system.

The Run-Time System

As mentioned previously, in the present invention, each input pixel level is evaluated against one of the elements in the normalized dither template 26 to determine the value of the output pixel for display on device 30.

The normalized dither template, in this embodiment, is derived prior to the receipt of input pixels and has been adjusted according to the tone error of the output device. Accordingly, in contrast to the prior art method of tone adjustment, there is no extra mapping that must be done to the input pixel before comparison with the normalized dither template. Rather, the below Equation IV may be used to evaluate the output pixel level.

$$\text{output} = \text{Quantizer}\{\text{input} + RANK_N\} \qquad \text{EQUATION IV}$$

For the special case of bitonal output, where NOL=2, the computation can be simplified as shown below in Equation V.

$$\text{if (input} > RANK_N) \text{ then output=1 else output=0} \qquad \text{EQUATION V}$$

The QUANTIZER function of Equation IV is used to allocate the number of input pixels to the number of output pixels for the given output device 30. The preferred method of quantization is that described in the Ulichney patent, cited above, due to the mean-preserving result of the quantization method. It should be understood, however, that other quantization methods known to those of skill in the art may also be used with this invention.

The run time system executes in real time, at the rate that input pixels are fed to the system. Prior to the operation of the run-time system, the normalized dither array 26 is generated by the dither template generator 12, the tone map LUT 20 and the normalization system 24, as described above. Because compensation for the tone error of the output device is accomplished once, during the generation of the normalized dither template 26, additional mapping of input pixels need not be performed during run-time, and the overall performance of the graphics system 10 is significantly increased.

Figure 6:
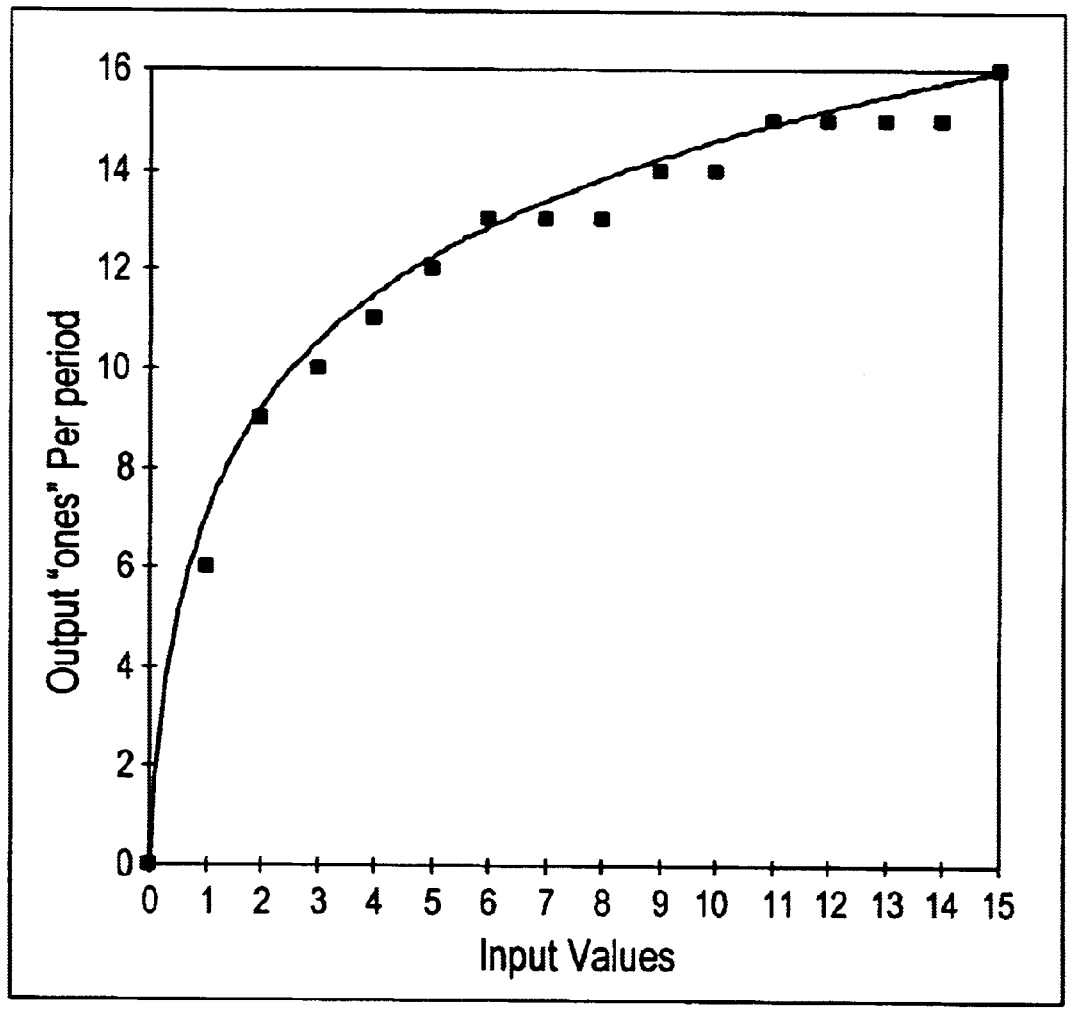
FIG. 6 is a graph illustrating the run-time system output of a graphics system using the normalized dither template of FIG. 3C.

Referring now to FIG. 6, a graph illustrating the dithering of an input image using the normalized template of FIG. 3C and FIG. 5 is shown. To formulate the graph of FIG. 6, a stream of input levels is fed into the run-time system 28 (FIG. 2), and the number of "ones" (i.e. pixels turned off) are measured for a given period, or area of the output image. It is in FIG. 6 where the loss of fidelity of the output image is most evident due to mapping of many input levels to one output level. Such a mapping results in a loss of distinct output levels, creating undesirable artifacts known as "spurious contours" or "course quantization".

A method and apparatus for providing tone correction of a graphics system by correcting elements of the dither template has been described. The method has a distinct performance advantage in that it eliminates the need for performing mapping of the input pixel level during run-time operation. Thus, the above described method provides an efficient mechanism for providing tone correction in a graphics subsystem.

However, as illustrated in the graph of FIG. 6, a loss of fidelity may occur when the number of threshold levels in the dither template is less than or equal to the number of input levels of the input image. By using a dither template such as that provided with the void and cluster method, or a similar method that allows for threshold values in excess of the number of input levels, the fidelity of the output image is improved because a one to one mapping from input levels to output representations may be provided.

Figure 7:
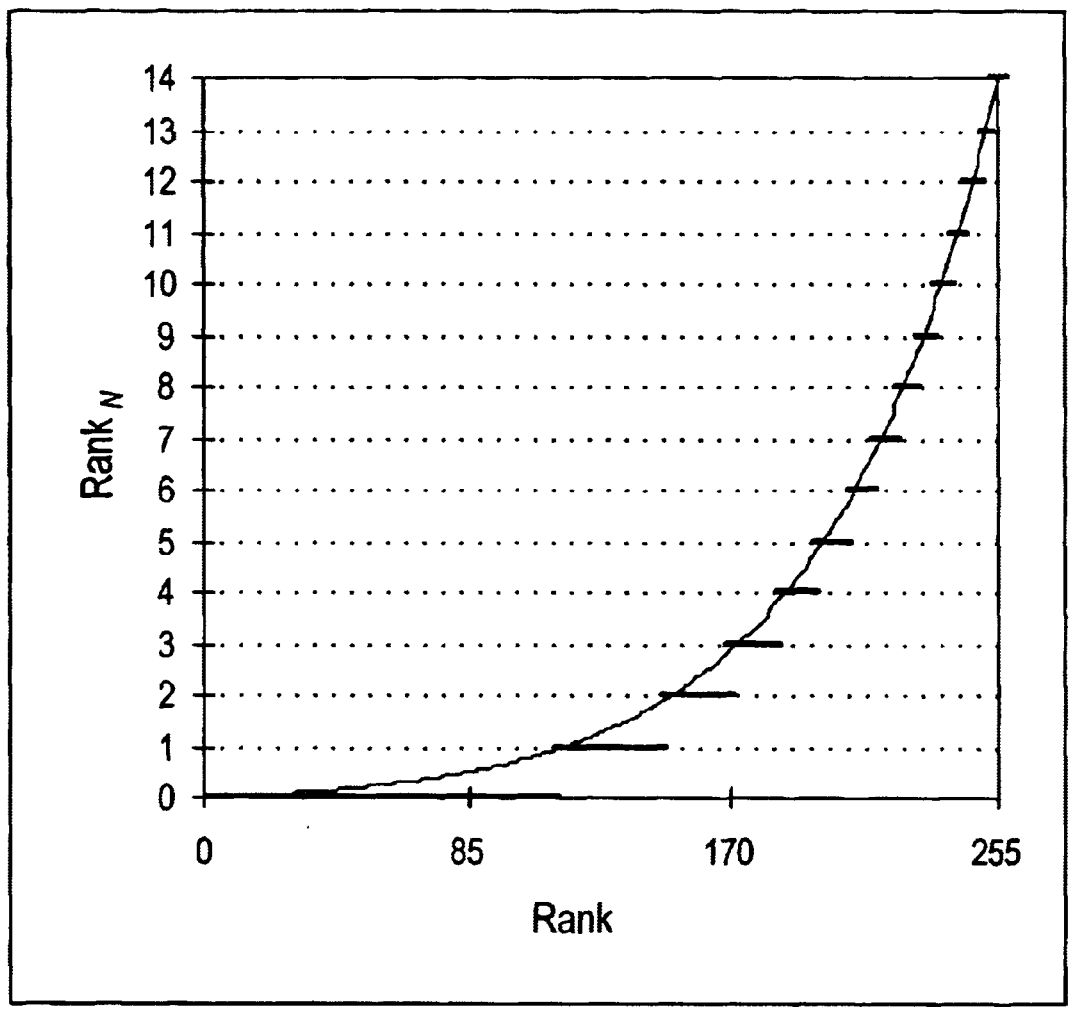
FIG. 7 is a graph illustrating the results of the mapping of tone correction data and normalization on a dither template having more threshold values than levels of the input image.

Until this point, a dither template having the number of threshold values equal to the number of input levels has been described. Referring now to FIG. 7, an example will now be described wherein an input image having 16 levels is represented on an output device using a dither template having 256 unique threshold values.

In FIG. 7, a graph of the input RANK threshold values from the dither template generator 12 versus the normalized threshold values, $RANK_N$, provided from the normalization 24 system is shown. The $RANK_N$ values were determined as described previously, using Equations I–III above and a mean-preserving quantization method. Note that in FIG. 7 each normalized $RANK_N$ value maps to at least one RANK threshold value. In addition, although the normalized $RANK_N$ value of 15 is not shown, it is understood that a $RANK_N$ of 15 will always be 'on' according to the run-time system.

Figure 8:
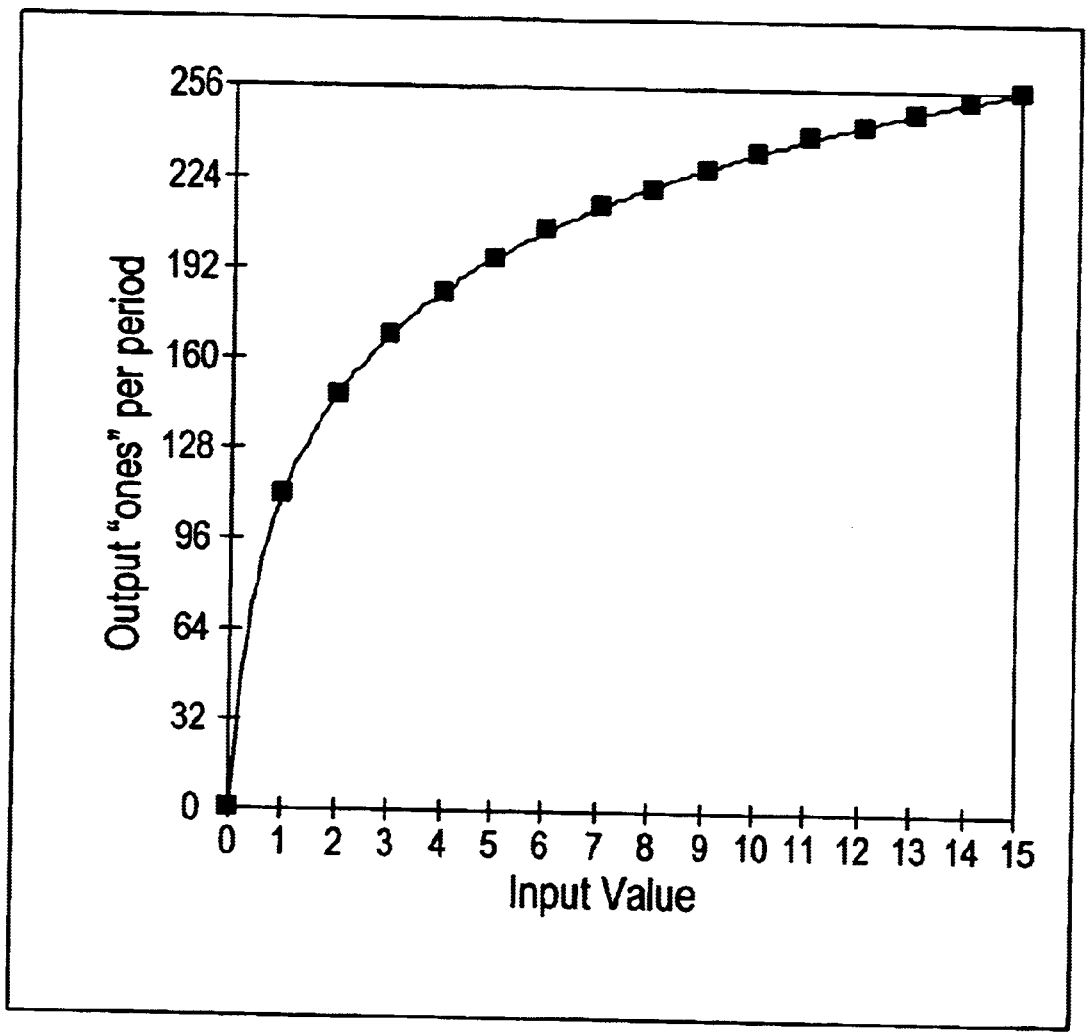
FIG. 8 is a graph illustrating the run-time system output of a graphics system using the normalized dither template described in conjunction with FIG. 7.

Referring now to FIG. 8, the results of using the normalized dither template represented by the graph of FIG. 7 in the run-time system 28 described with regard to Equations IV and V is shown. As described previously with regards to FIG. 6, to formulate the graph of FIG. 8 a stream of input levels is fed into the run-time system and the number of "ones" (i.e. pixels turned off) are measured for a given period, or area of the output image.

Note that in FIG. 8, a unique number of "ones" is output for each input representation level. Because no input levels are 'lost', the true fidelity of the input image is maintained.

Providing tone correction by adjusting the values of entries in a dither template, where the number of thresholds of the dither template exceeds the number of input levels of the input image results in three main advantages over the prior art method. First, because there are unique mappings for each input level, the result is a higher quality rendered image with more accurate tone adjustment, and without loss of input levels or spurious contours. In addition, a simpler run-time system is provided, where there are no additional mapping steps to be done on the input pixel. Finally, the above method provides a simple method for updating tone adjustment mappings to a given dither template by merely updating data values in the Tone Map LUT without regenerating the original dither template values.

Having described a preferred embodiment of the invention, it will now become apparent to one of skill in the art that other embodiments incorporating its concepts may be used. It is felt, therefore, that this invention should not be limited to the disclosed embodiment, but rather should be limited only by the spirit and scope of the appended claims.

I claim:

1. A method for creating a dither array for use in generating output images by an output device based on corresponding input images having a number of input levels, the output device supporting a number of output levels and having a tone error characteristic, the method comprising the steps of:

receiving a tone map that corrects the tone error characteristic of the output device;

receiving an initial dither template for use in performing digital halftoning, the dither template having a plurality of template levels;

modifying the template levels of the initial dither template based on the received tone map to produce an adjusted dither template;

normalizing the template levels of the adjusted dither template in response to the number of levels of the input images and the number of levels of the output device to produce a dither array having a plurality of dither values; and utilizing the dither array in a run-time dither system to generate an output image based on a given input image.

2. The method of claim 1 wherein the normalized dither array is produced prior to receipt of a given input image to be represented by the output device.

3. The method of claim 1 wherein the tone correction received for the output device is given by an equation f(x) where x is the image input level, and the modified template levels of the adjusted dither template are determined by the following equation:

$$RANK_A = (NTL-1) * f(x)$$

where, $RANK_A$ is a modified template level,

NTL is the number of template levels of the initial dither template, and

RANK/(NTL-1) is substituted for x in the equation f(x), where RANK is a template level of the initial dither template.

4. The method of claim 3 wherein the step of normalizing comprises the step of apportioning each dither template level to a corresponding dither array value.

5. The method of claim 4 wherein the apportioning step comprises the step of: determining a quantization step size, $\Delta Q$, through the following equation:

$$\Delta Q = (NIL-1)/(NOL-1),$$

where

NIL is the number of input levels, and

NOL is the number of output levels.

6. The method of claim 5 wherein the normalized dither values of the dither array are determined through the following equation:

$$RANK_N = int\{\Delta Q/NTL * (RANK_A + \tfrac{1}{2})\} \text{ where}$$

$RANK_N$ is a normalized threshold level, and int{ } is a rounding down operation.

7. The method of claim 6 wherein the run-time system computes an output level for each input level using the following equation:

$$\text{output level} = \text{Quantizer}\{\text{input level} + RANK_N\}$$

where Quantizer { } is a function for allocating input pixels to output pixels.

8. The method of claim 7 wherein the Quantizer { } function is selected so as to produce a mean-preserving result.

9. The method of claim 6 wherein a given input image has a plurality of pixels each having a corresponding input level, the output device defines first and second output levels, and the first output level is utilized if the input level of a selected input pixel is greater than the corresponding $RANK_N$ from the modified and normalized dither array, otherwise the second output level is utilized.

10. The method of claim 6 wherein the normalized dither array is produced prior input image to be represented by the output device.

11. The method of claim 1 wherein the number of template levels of the initial dither template exceeds the number of input levels of the input images so that there is a one-to-one mapping of image input levels to dither values within the normalized dither array.

12. The method of claim 11 wherein the normalized dither array is produced prior to receipt of a given input image to be represented by the output device.

13. The method of claim 11 wherein the tone map is stored in a look up table.

14. The method of claim 11 wherein the tone correction received for the output device is given by an equation f(x) where x is the image input level, and the modified template levels of the adjusted dither template are determined by the following equation:

$$RANK_A = (NTL-1)*f(x)$$

where, $RANK_A$ is a modified template level,

NTL is the number of template levels of the initial dither template, and

RANK/(NTL−1) is substituted for x in the equation f(x), where RANK is a template level of the initial dither template.

15. The method of claim 14 wherein the step of normalizing comprises the step of apportioning each dither template level to a corresponding dither array value.

16. The method of claim 15 wherein the apportioning step comprises the step of: determining a quantization step size, $\Delta Q$, through the following equation:

$$\Delta Q = (NIL-1)/(NOL-1),$$

where

NIL is the number of input levels, and

NOL is the number of output levels.

17. The method of claim 16 wherein the normalized dither values of the dither array are determined through the following equation:

$$RANK_N = int\{\Delta Q/NTL*(RANK_A + \tfrac{1}{2})\} \text{ where}$$

$RANK_N$ is a normalized threshold level, and int{ } is a rounding down operation.

18. The method of claim 17 wherein a given input image has a plurality of pixels each having a corresponding input level, the output device defines first and second output levels, and the first output level is utilized if the input level of a selected input pixel is greater than the corresponding $RANK_N$ from the normalized dither array, otherwise the second output level is utilized.

19. The method of claim 17 wherein the run-time system computes an output level for each input level using the following equation:

$$\text{output level} = \text{Quantizer }\{\text{input level} + RANK_N\}$$

where Quantizer { } is a function for allocating input pixels to output pixels.

20. The method of claim 19 wherein the Quantizer { } function is selected so as to produce a mean-preserving result.

* * * * *